Figure 1:
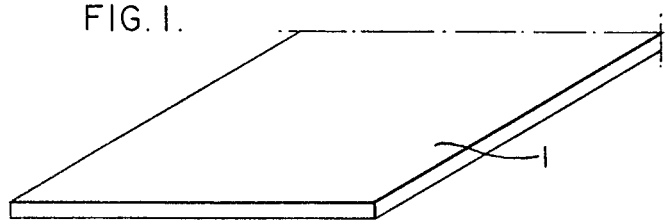

United States Patent [19]

Vitt

[11] 4,126,721
[45] Nov. 21, 1978

[54] SEALING SHEETING

[75] Inventor: Josef Vitt, Mannheim, Germany

[73] Assignee: Braas & Co., GmbH, Frankfurt, Germany

[21] Appl. No.: 797,263

[22] Filed: May 16, 1977

[30] Foreign Application Priority Data

May 17, 1976 [DE] Fed. Rep. of Germany ....... 2621825

[51] Int. Cl.² .......................... D06N 7/00; B32B 5/08; B32B 17/04
[52] U.S. Cl. .................................... 428/339; 428/247; 428/255
[58] Field of Search ............... 428/247, 252, 255, 268, 428/332, 920, 921, 338, 339; 264/176; 156/176–179, 279, 71, 244.11

[56] References Cited

U.S. PATENT DOCUMENTS

| 3,322,612 | 5/1967 | Burd ................................. 428/921 X |
| 3,399,091 | 8/1968 | Corney et al. ......................... 156/71 |
| 3,592,724 | 7/1971 | King et al. ....................... 428/921 X |

Primary Examiner—William A. Powell
Attorney, Agent, or Firm—John J. Byrne

[57] ABSTRACT

A sealing sheeting for the construction industry with elastomeric properties at elevated temperatures. Further, the invention concerns the production method for such sheeting.

11 Claims, 4 Drawing Figures

SEALING SHEETING

Sheeting for the sealing of surfaces in above-ground construction, underground construction and construction of industrial structures must have a number of different properties in order to comply with various requirements. Among these properties are good mechanical resistance and sufficient tension, at room temperature as well as higher temperatures up to about 100° C. The sheets should also be resistant for many years to weather impact including being light-proof, and resistant to ultraviolet radiation and ozone; it must be waterproof and capable of easy and solid welding of individual sheeting lengths into larger permanently waterproof covers and should have good aging characteristics. In addition, such sheeting should be capable of being produced from inexpensive and readily available materials with simple processes.

In order to fulfill these requirements, sheeting of many different compositions and/or laminate-type structures made of several cohesive individual layers have been proposed.

For instance, the German Disclosure No. 2,415,850 describes a length made of an elastomeric, rubberlike substance for waterproof covering of buildings. This consists essentially of 10–60% by weight synthetic latex (ethylene-vinyl acetate mixed polymeride with 18 to 70 wt.% of vinyl acetate), 3 to 50 wt.% of ethylene-propylene tripolymeride, 5 to 30 wt.% polyvinyl chloride, 0 to 20 wt.% of asphalt and 20–60 wt.% of fillers. The German Disclosure No. 2,410,572 describes a method for producing sheeting with elastomeric properties at elevated temperatures, with which one obtains a sheeting which contains along with various optional components 5 to 50 parts-by weight of polystryol, 5 to 20 parts-by weight of an ethylene polymeride, 5 to 20 parts-by-weight of an ethylene-propylene tripolymeride, 5 to 75 parts-by-weight of an ethylene-propylene tripolymeride, 5 to 75 parts-by-weight of soot, 5 to 50 parts by weight of plasticizer, 0.5 to 4 parts by weight stabilizer as well as 1 to 8 parts-by-weight of a release agent, per 100 parts-by-weight of a thermoplastic latex (e.g. polystyrolpolybutadien block copolymer). This known sheeting has a tensile strength of 150 (143) kp/cm$^2$ at room temperature and a breaking elongation of 870 (910)%. Further valuable properties of this known sheeting are good resistance to weather and ozone as well as good mechanical properties at elevated temperatures.

Another important group of sealing sheeting for the construction industry contains polyisobutylene as elastomer components. Methods for the production of such polyisobutylene-containing sheeting are described in the German Disclosures Nos. 1,778,014 and 2,214,599. In addition to the polyisobutylenes these known sheeting also contain ethylene polymers, fillers, such as calcium carbonate and silicate, soot and release agents such as perhaps calciumstearate. Advantageous properties of sheeting containing polyisobutylene are their good resistance to tensile corrosion, good folding resistance and good resistance to ageing.

It is the task of the present invention to make available a new sealing sheeting for the construction industry, which, in addition to the properties of the sheeting known for the German Disclosure No. 2,410,572, such as good functioning ability at temperatures between −60° and 100° C, and excellent weather—and ozone—resistance, also has the advantageous properties of the sheeting containing polyisobutylene, as well as excellent light fastness and is capable of being made into large waterproof cover made of several sheeting lengths by means of solution welding or hot-air welding.

Starting with a sheeting with a content of thermoplastic latex, ethylene polymerides, filler, release agent, plasticiser, stabilizer, and possibly additional components, the solution according to this invention is characterized in its most common form by the fact that the sheeting contains 5 to 50 parts-by weight of chlor-sulfonated polyethylene for every 100 parts-by-weight of thermoplastic latex, especially polystyrol-polybutadien copolymeride.

According to a special formation of the invention, the sheeting consists essentially of
- 100 parts-by-weight thermoplastic latex, especially polystyrol-polybutadiene copolymerides,
- 5 to 50 parts-by-weight of chlorsulfonated polyethylene,
- 30 to 200 parts-by-weight of mineral fillers,
- 5 to 25 parts-by-weight of plasticiser,
- 1 to 6 parts-by-weight of a release agent,
- 1 to 8 parts-by-weight of a stabilizer.

From these components of the sheeting of this invention, one obtains, depending upon the purity of the various raw materials, an opaque white to beige sheeting. The sheeting can be used in that form, or it can be colored with up to 10 parts-by-weight coloring material to every 100 parts-by-weight of the thermoplastic latex, as desired. In addition to these necessary components, the sheeting may contain 0 to 15 parts-by-weight of polystyrol and 0 to 15 parts-by-weight of an ethylene polymer for every 100 parts by weight of thermoplastic latex.

In order to improve resistance to wind-carried fire and radiation heat, the sheeting for this invention may contain, in addition to the above-mentioned components, 5 to 15 parts-by-weight of brominated hydrocarbons, 5 to 15 parts-by-weight of antimony trioxide, and 0 to 50 parts-by-weight of a material that releases water vapor at elevated temperatures, per 100 parts-perweight of thermoplastic latex.

A preferred form of the sheeting for this invention consists of the following components:
- 100 parts-by-weight polystyrol-polybutadiene copolymeride,
- 30 to 40 parts-by-weight of chlorsulfonated polyethylene,
- 25 to 35 parts-by-weight of titanium dioxide as rutile,
- 20 to 30 parts-by-weight of silicate (average grain 0.5 $\mu$m)
- 7 to 12 parts-by-weight of antimony trioxide,
- 8 to 12 parts-by-weight of an aromatic bromine compound, containing 84.7% bromine,
- 5 to 15 parts-by-weight of a plasticizer based on epoxy with 6 or more wt.% of epoxy-oxygen,
- 0.5 to 5 parts-by-weight of a highly active magnesium oxide,
- 1.0 to 2.0 parts-by-weight of a nickel complex salt
- 0.3 to 0.8 parts-by-weight of a triazine derivative
- 0.5 to 5.0 parts-by-weight of a tertiary butylphenol (butylated phenol)
- 1.5 to 5.0 parts-by-weight of a high molecular fatty acid ester with a drip point of 50° to 52° C A thermoplastic latex that is especially useful in the production of the sheeting, in accordance with the present invention, is a block copolymeride of polystyrolpolybutadien with a polystyrol content of 30 or 40 wt.% of polystyrol and an inherent viscosity (in toluol) of approximately 1.00 to 1.50. Especially useful is the use of a mixture of various block polymerides, for example an application of a mixture of 70 wt.% of a block polymeride of polystyrol and polybutadien with a block styrol content of 40 wt.% and an inherent viscosity (in toluol) of 1.10, and 30 wt.% block copolymeride of polystyrol and polybutadien with a block styrol content of 30 wt.% and an inherent viscosity (in toluol) of 1.40. Such polystyrolpolybutadiene block copolymerides are readily accessible and available in the trade.

These selected components, namely polystyrol-polybutadiene block copolymerides with an inherent viscosity of 1.00 to 1.50 (in toluol) and chlorsulfonated polyethylenes with a chlorine content of 25 to 43 wt.% result, in combination with the further sheeting components, in mixing at 100° to 185° C, in a homogeneous, plastic material that allows its further application to the production of sealing sheeting with the desired properties, without notable decomposition or other breakdown.

For the production of the sheeting according to this invention, the above-mentioned components are carefully mixed together and the mixture obtained is converted into sheeting without any necessary vulcanization. It is possible to carry out all steps of the process in a multi-step extruder in which the components are added in the first step and mixed with each other and, in the last step are extruded into a sheeting tube by means of a circular nozzle that is, subsequently cut into the shape of the desired sheeting.

According to an alternative process, it is possible to introduce the components into a heatable, mechanically working blender, to blend them carefully there, to pelletize the mixture obtained in this manner, and to introduce these pellets into an extruder or a calender.

An important characteristic of the process according to this invention consists of the fact that the mixing of the components takes place by an "upside-down" method. A part of the sheeting constituents is first placed into a kneading machine; these components are the fillers, plasticizers, release agent, and the other additions. Immediately following, the polystyrolpolybutadiene copolymeride and the chlorsulfonated polyethylene are added and all components are blended; accordingly, the blend suitable for the production of the sheeting is obtained. Preferably, this process takes place at temperatures between 100° and 185° C.

The blend that is obtained can subsequently be shaped into a sheet at moderate temperatures. This can take place by means of an extruder with a slot head, an extruder with a ring head or by means of a calender. This method produces an endless sheeting, i.e. a sheeting with over 10 m length, whose width depends upon the device that is used. A thickness of 0.4 to 2 mm is anticipated for the sheeting according to this invention, while a thickness of 0.8 to 1.2 mm is especially preferred.

Reinforcement of the sheeting for this invention for a variety of applications may be useful; it may be achieved by means of a fleece or a fabric of textile or glass fibers. The fleece can be placed upon the foil with adhesives or under heat and pressure and thus be permanently connected to it. Fabrics can be similarly attached to the sheeting. Finally, a laminate-type structure is also possible, in which a fabric is attached to the sheeting for this invention and another sheeting for this invention or any other sheeting is attached, so that all layers are permanently connected to each other. The thickness of fleece or fabric reinforced sheets, resp. the thickness of a multilayer structure may approach 3 mm.

Such sheetings are also schematically shown in FIGS. 1 to 4.

FIG. 1 shows the sheeting 1 of this invention, produced from a homogeneous mixture without additional reinforcement.

Figure 2:
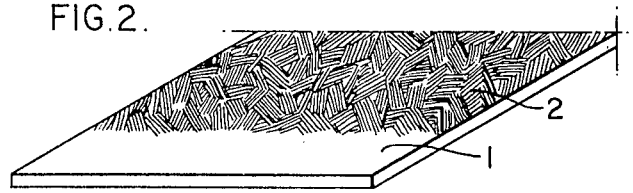

FIG. 2 presents a sheeting 1 that is reinforced on one side with a glass fiber fleece 2.

Figure 3:
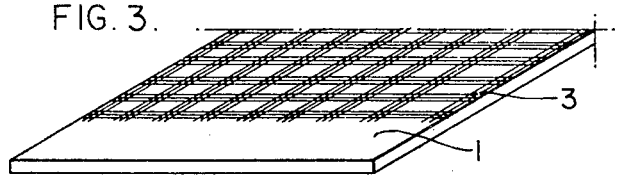

FIG. 3 presents a sheeting that is reinforced on one side with a fabric 3 of textile fibers.

Figure 4:
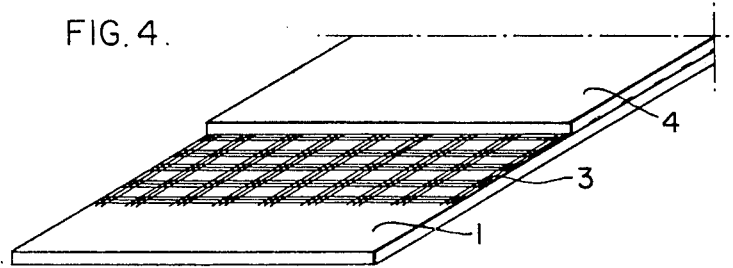

FIG. 4, finally, shows a multilayer structure, where on the sheeting for this invention 1 a textile fabric 3, and above it an additional sheeting for this invention have been applied.

The properties of the sheeting for this invention are excellently adapted to the demands made of sealing sheeting for the construction industry. Primarily, an excellent functioning ability with sufficient flexibility and tension are to be mentioned. These are given at temperatures between −60° to 100° C. Further, the sheeting for this invention is highly resistant to a high degree against ultraviolet radiation and ozone and is not substantially attacked by environmental influences in the course of several years. Within the framework of the present invention, this sheeting is used especially as a sealing sheeting in subterranean construction, as an insulation material for roofs, and as a pinched-in profile strip for roof ends. Any waste, for instance cuttings caused by production, can be fully reused since with the indicated production method and temperature no depolymerization of the thermoplastic latex or decomposition of the chlorsulfonated polyethylene takes place as yet in the presence of stabilizers.

The following example serves to explain the invention without limiting it.

Seventy parts of a block copolymeride of polystyrol and polybutadiene with a styrol content of 40 wt.% and an inherent viscosity (in toluol) of 1.10, 30 parts of a block copolymeride of polystyrol and polybutadiene with a styrol content of 30 wt.% and an inherent viscosity (in toluol) of 1.40, 35 parts of chlorsulfonated polyethylene with a chlorine content of 35 wt.%, 30 parts rutile, 25 parts silicate, 9 parts antimony trioxide, 9 parts of an aromatic bromine compound containing 84.7 wt.% bromine, 10 parts epoxy plasticizer with 6 or more wt% of epoxy oxygen, 1 part highly active magnesium oxide, 1.5 parts nickel complex salt, 0.5 parts triazine derivative, 1 part tertiary butyl phenol and 2.5 parts of a high molecular fatty acid ester with a drop point of 50° to 52° C were blended in a pestle kneading machine according to the "upside-down" method. The blend obtained was immediately brought into an extruder in which the blend was extruded into a tube-shaped sheeting that, after cooling, had a thickness of approximately 1 mm.

This sheeting was subsequently stored at room temperature for 48 hours and finally the properties indicated below were determined. The measurements took place according to known procedures, as provided by the DIN standards. The results presented in the following table were obtained.

|  | parallel to the direction of extrusion | Perpendicular to the direction of extrusion |
| --- | --- | --- |
| tear strength (DIN 53504) at room temperature (RT), in kp/cm², SII standard | 156.0 | 152.0 |
| tear strength at 80° C | 10.6 | 9.4 |
| after aging (DIN 53508) 28 days at 70° C | 164 | 159 |
| Rupture tension (DIN 53504) at room temperature, % | 950 | 1025 |
| Rupture tension at 80° C | 300 | 350 |
| after aging (DIN 53508) 28 days at 70° C | 900 | 950 |
| progressive tear loan (DIN 53515) at room temperature, kp/cm | 28 | 26 |
| progressive tear loan at 80° C | 12 | 11 |
| after aging (DIN 53508) 28 days at 70° C | 30 | 28 |
| slit fracture test according to DIN 16935 | passed | |
| Text according to DIN 4102, part 7 (wind-carried fire and radiant heat) | passed | |
| Rebound elasticity according to DIN 53512, % | | 31 |
| Cold durability (DIN 53361), ° C | | −60 |

In a general manner, while there has been disclosed an effective and efficient embodiment of the invention, it should be well understood that the invention is not limited to such embodiment, as there might be changes made in the arrangement, disposition, and form of the parts without departing from the principle of the present invention as comprehended within the scope of the accompanying claims.

I claim:

1. Sealing sheeting for the construction industry having elastomeric properties at elevated temperatures, with a content of thermoplastic latex, polymerized ethylene, fillers, release agent, plasticizer and stabilizer, characterized by the fact that the sheeting contains 5 to 50 parts-by-weight of chlorsulfonated polyethylene for every 100 parts-by-weight of a thermoplastic latex.

2. The sheeting of claim 1 characterized by the fact that the sheeting essentially consists of:
   100 parts-by-weight thermoplastic of block copolymerides of polystyrol-polybutadiene,
   5 to 50 parts-by-weight chlorsulfonated polyethylene,
   0 to 15 parts-by-weight polystyrol,
   0 to 15 parts-by-weight polymerized ethylene
   30 to 200 parts-by-weight fillers
   5 to 25 parts-by-weight plasticizer
   1 to 6 parts-by-weight release agent,
   1 to 8 parts-by-weight stabilizer and
   0 to 10 parts-by-weight of coloring matter.

3. Sheeting for claim 1 characterized by the fact that the sheeting essentially consists of:
   100 p.b.w. thermoplastic latex, especially block copolymers of polystyrol-polybutadiene,
   5 to 50 p.b.w. chlorsulfonated polyethylene
   30 to 200 p.b.w. fillers
   5 to 25 p.b.w. plasticizer
   1 to 6 p.b.w. release agent
   1 to 8 p.b.w. stabilizer
   5 to 15 p.b.w. antimony trioxide
   0 to 10 p.b.w. coloring matter.

4. Sheeting for claim 3 characterized by the fact that the sheet also contains up to 50 p.b.w. of a material that releases water vapors at elevated temperatures.

5. Sheeting for claim 1 wherein said thermoplastic latex is 100 p.b.w. block copolymerides of polystyrol polybutadiene and said sheet futher comprises:
   30 to 40 p.b.w. chlorsulfonated polythylene,
   25 to 35 p.b.w. rutile
   20 to 30 p.b.w. silicate
   7 to 12 p.b.w. antimony trioxide
   8 to 12 p.b.w. aromatic bromine compound with 87.7wt.% bromine
   5 to 15 p.b.w. epoxy plasticizer with 6 or more wt% epoxy oxygen
   0.5 to 1.5 p.b.w. highly active magnesium oxide
   1.0 to 2.0 p.b.w. nickel complex salt
   0.3 to 0.8 p.b.w. triazine derivative
   0.5 to 2.0 p.b.w. tertiary butyl phenol
   1.5 to 5.0 p.b.w. high molecular fatty acid ester with a drop point of 50° to 52° C.

6. The sheeting of claim 1 wherein said sheeting has a thickness of 0.4 to 2.0 mm.

7. The sheeting of claim 1 wherein said sheeting has a thickness of 0.8 to 1.2 mm.

8. The sheeting of claim 1 characterized by the fact that said sheet is reinforced by glass fibers.

9. The sheeting of claim 1 characterized by the fact that said sheet is reinforced by synthetic fibers.

10. A method for the production of sheeting comprising the steps of initially placing a part of the sheeting components, namely fillers, plasticizer, release agent, and further components into a kneading machine and immediately thereafter adding a thermoplastic latex of a block copolymeride of polystyrol polybutadiene and chlorsulfonated polyethylene, blending said components, and forming said blended material into sheets.

11. The process of claim 10, characterized by the fact that the steps are carried out at temperatures between 100° and 185° C.

* * * * *